(No Model.)

A. V. SMITH.
LINK PROTECTOR.

No. 279,831.  Patented June 19, 1883.

Witnesses:
Geo. H. Strong
J. F. Krouse

Inventor,
Andrew V. Smith
By Dewey & Co.
Attorneys

UNITED STATES PATENT OFFICE.

ANDREW V. SMITH, OF SAN FRANCISCO, CALIFORNIA.

LINK-PROTECTOR.

SPECIFICATION forming part of Letters Patent No. 279,831, dated June 19, 1883.

Application filed April 10, 1883. (No model.)

*To all whom it may concern:*

Be it known that I, ANDREW V. SMITH, of the city and county of San Francisco, State of California, have invented an Improved Link-Protector; and I hereby declare the following to be a full, clear, and exact description thereof.

My invention relates to a new and useful means for protecting links from wear by friction, whether said links are used in a chain or singly.

My invention consists in a peculiar independent removable bearing adapted to fit and to be wedged or keyed into the end of the link.

The object of my invention is to prevent wear of the link.

Figure 1:
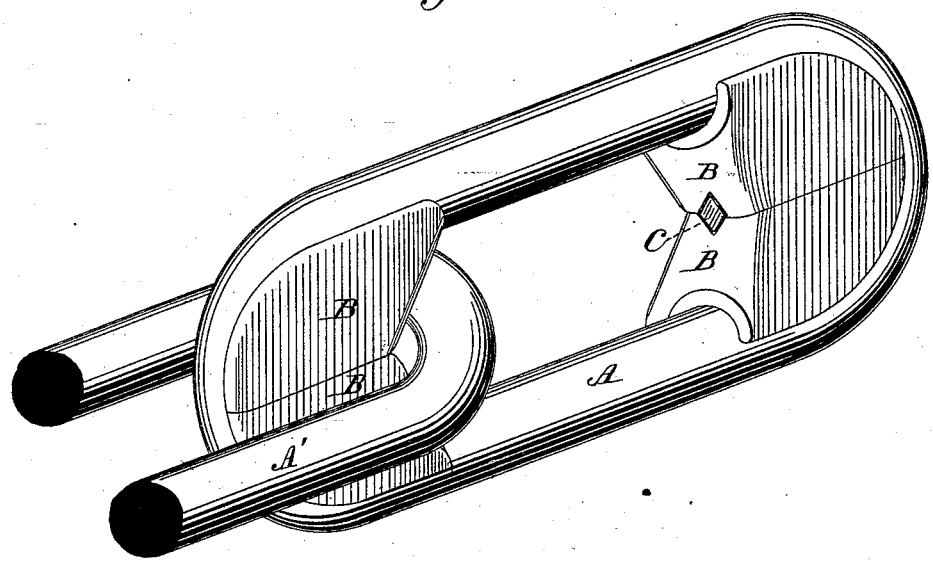
Figure 2:
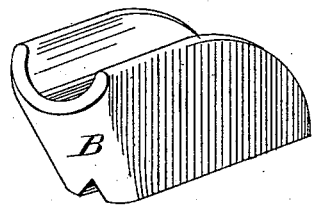
Figure 4:
Figure 3:
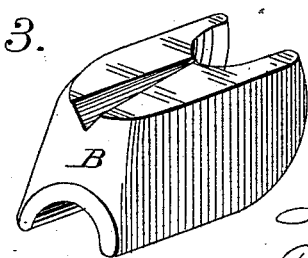

Referring to the accompanying drawings, Figure 1 is a perspective view of engaging links, showing my device applied to one of them. Fig. 2 is a view of the upper piece B. Fig. 3 is a view of the lower piece B. Fig. 4 is a view of the wedge-key C.

Within each end of the link A and fitted to that part of the inner circumference subject to friction or wear are inserted two pieces, B, of forged or cast iron grooved on their edges or sides of contact with the link and fitting it, whether the metal forming said link be square, round, or of other shape. This bearing thus formed extends over the width of the link. The sides of contact of the pieces B with each other are straight, and are each provided with a groove, thus forming a hole into which is driven a wedge-shaped key, C. This key forces the pieces apart and binds them on the link. The key, when driven in as far as desired, is cut off flush with the edge of pieces B, in order to allow a smooth bearing for the engaging link or hook. The inner edge of the bearing formed by pieces B is preferably concaved to preserve the contour of the link, whereby the engaging link A' may fit it better. By thus driving in the key the pieces are forced apart and the interstice formed, as well as the spaces around the outer grooved faces of pieces B and the link, should be filled in with some suitable resinous or metallic cement.

By this device the link itself cannot suffer from wear, and as this bearing may be readily removed and another inserted the link may be preserved indefinitely.

The device is comparatively inexpensive and may be readily applied. It is particularly important in the coupling-link of railway-cars and in the link connecting the buoy with its sinker.

In the manufacture of this device the separate pieces may be numbered and lettered with respect to the size of metal forming the link and of the opening or width between the sides, and this will induce and occasion the manufacture of links with a corresponding number and letter imprinted thereon.

I am aware that it is not new to provide chain-links at their ends with blocks to prevent wear, and so constructed that the successful use of the chain will not be interfered with, and I do not claim the same, broadly; but What I do claim as new, and desire to secure by Letters Patent, is—

1. In combination with a link, a two-part independent bearing-piece fitted within its ends and keyed or otherwise secured therein, substantially as and for the purpose herein described.

2. A link, in combination with the independent bearing-pieces B in the ends of the link, and having their outer faces fitting the link, and a wedge-key, C, driven between the meeting faces of pieces B to bind them in said link, substantially as herein described.

3. The link A, in combination with the independent bearing-pieces B in the ends of the link, and having grooved outer faces fitting said link, and the wedge-key C, driven between said pieces to bind them in the link, substantially as herein described.

In witness whereof I hereunto set my hand.

ANDREW V. SMITH.

Witnesses:
 G. W. EMERSON,
 J. H. BLOOD.